Aug. 6, 1929.                H. E. SIPE                 1,723,307
                           COUPLING STRIP
                         Filed March 7, 1928
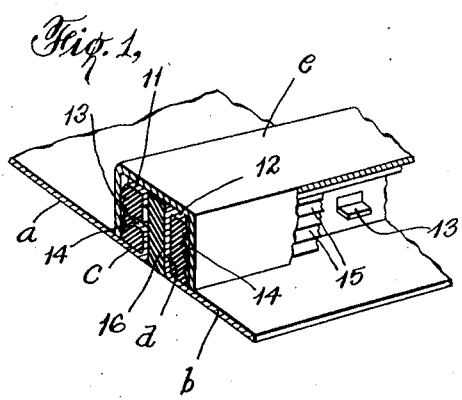
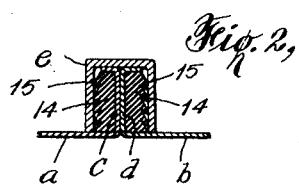
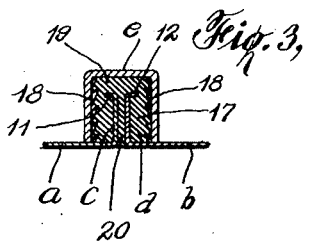
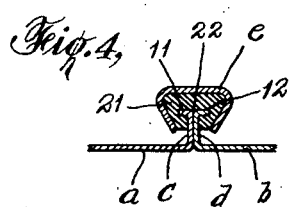
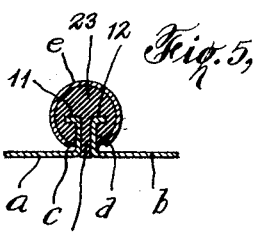
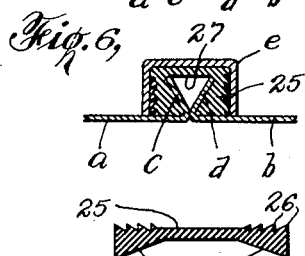
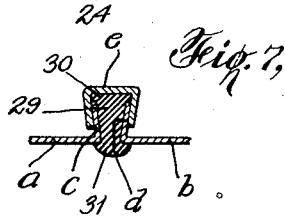
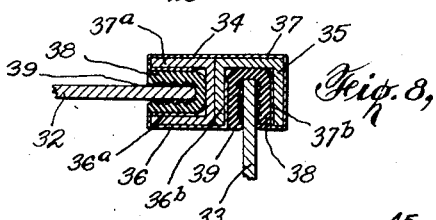
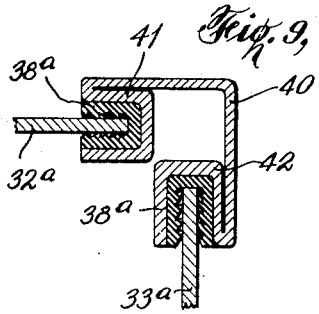
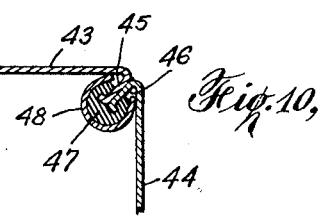
INVENTOR
Harry E. Sipe
BY
ATTORNEY Patented Aug. 6, 1929.

1,723,307

UNITED STATES PATENT OFFICE.

HARRY E. SIPE, OF NEW YORK, N. Y.

COUPLING STRIP.

Application filed March 7, 1928. Serial No. 259,883.

This invention relates to coupling strips and particularly to devices of this class composed of rubber or similar yieldable material for use in coupling two or more body members together or in mounting one body member in connection with another; and the object of the invention is to provide a strip of the class specified, comprising an elongated body of rubber with means thereon for engaging one or more surfaces of one body member to prevent the displacement of said strip in coupling another body member therewith and to securely couple said body members and to provide a yielding or cushion mounting for said body parts one with relation to the other; a further object being to provide a strip of the class specified, one or more of which may be employed in coupling two body members together, and a rigid coupling member or strip cooperating with the first named strip or strips confining the same as to expansion in one or more directions; and with these and other objects in view, the invention consists in a coupling strip and method of coupling body members together, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional and perspective view showing one method of carrying my invention into effect.

Figs. 2, 3, 4, 5, 6 and 7 are cross sectional views of modified forms of construction.

Fig. 6ª is an extended sectional view of a part of the construction contained in Fig. 6.

Figs. 8 and 9 are sectional, detail views showing a method of coupling two members arranged angularly with reference to each other in a corner post or body; and, Fig. 10 is a sectional, detail view showing another form of corner construction.

This application includes divisional subject matter of a prior application filed by me September 16, 1927, and bearing Serial No. 220,050. In the present case, my invention consists in the provision of a coupling strip or body preferably composed of rubber or rubber composition, but which may be composed of any similar yieldable material, and is employed in coupling two or more metallic or other rigid bodies or a metallic body and another type of rigid body such for example as a glass, hard rubber, bakelite, wood or similar panel or member.

In Figs. 1 to 7 inclusive, the reference character $a$ represents one rigid member or body adapted to be coupled with another rigid member or body $b$. In all of these figures, each of the members $a$ and $b$ have right angle or other angular flanges extending from one face thereof, for example, the flanges $c$ on the parts $a$ and the flanges $d$ on the parts $b$.

In all of these figures, I also employ a channel-shaped coupling member or body $e$ of rigid material, which cooperates with the flanges $c$ and $d$ in coupling the members $a$ and $b$ together by the use of my improved coupling strip or strips.

In the construction shown in Fig. 1 of the drawing, the flanges $c$ and $d$ are provided at their inner ends with laterally extending flange portions 11 and 12. Spaced longitudinally of each flange $c$ and $d$ and fashioned from the material thereof, are outwardly extending lugs 13. One lug in the flange $c$ is shown in section, and one lug of the flange $d$ is shown in elevation.

In this construction, I employ two similarly formed coupling strips 14, one of which is positioned between the flange $c$ and one side wall of the channeled coupling $e$, and the other of which is positioned between the flange $d$ and the other wall of said coupling, it being noted that the lugs 13 extend into the body of the strips 14. The side edges of said strips are confined between the members $a$—$b$ and the flange portions 11 and 12. The outer faces of the strips 14 are provided with longitudinally arranged and transversely spaced grooves, forming correspondingly arranged and spaced ribs 15 which are inclined in the direction of the members $a$ and $b$ and are adapted to be compressed and flexed in mounting the members $a$ and $b$ in the coupling $e$ in securing said members together.

In this construction, I also preferably employ an intermediate strip 16 which may be of rigid or yieldable material, and which is arranged between the adjacent faces of the flanges $c$ and $d$. With this construction, as well as with the structures shown in Figs. 2, 3 and 6, the latter being later described in detail, the operation of securing the members $a$ and $b$ together by placing the flanges $c$ and $d$ with the coupling strips or body employed in the coupling member $e$ or the latter upon such flanges and strips, the strips or coupling body are placed under compression, and the projecting heads are flexed in the direction of the members $a$ and $b$ to prevent the removal or separation of the coupling $e$ when once placed in position. In this construction, the members $a$ and $b$ or their adjacent face portions are drawn together under the required tension to suit the requirements in apparatus of various kinds and classes. It is understood that the compression or coupling tension may be governed by the texture of the coupling strips and the arrangement and formation of the members 15 thereon.

The structure shown in Fig. 2 differs from that shown in Fig. 1, simply in that the lugs 13 are omitted as is also the intermediate strip 16, the flanges $c$ and $d$ being brought together in an abutting relation, and the entire coupling is made by the strips 14 with the members 15 thereon mounted on the outer faces of the flanges $c$ and $d$ and within the side walls of the coupling member $e$.

In Fig. 3 of the drawing, the lugs 13 are also omitted and this structure differs from that shown in Fig. 1 in the provision of a unitary coupling strip or body 17, the outer side walls of which are provided with ribs or projections 18 which may be similar to the ribs 15. The side portions of said strip are joined by a crosshead 19 arranged between the back wall of the channeled coupling $e$ and the flange portions 11 and 12, the latter being imbedded in the strip 17. The flanges $c$ and $d$ extend through said strip and are spaced apart by a body of rubber or cushioning material 20. In this construction, the coupling strip 17 is preferably fashioned with slots or recesses into which the flanges $c$ and $d$ and flange portions 11 and 12 may be placed.

In Fig. 4 of the drawing, I have shown a coupling strip 21 which is of substantially dove-tailed cross sectional form, and is provided at its outer side with a dove-tailed recess 22 extending longitudinally thereof, in which the flanges $c$ and $d$ and flange portions 11 and 12 are placed to key the members $a$ and $b$ within and to the coupling strip 21. In this construction, the coupling body $e$ or the side walls thereof are forced inwardly by suitable pressure, sufficient to place the coupling strip 21 or the side walls thereof under compression, or sufficient tension to securely couple the parts $a$ and $b$ together. With this form of construction, the rib members or other projections 15—18 are not employed, and this is also true of the construction shown in Fig. 5.

In Fig. 5, I have shown a coupling strip 23 which is substantially circular in cross sectional form, and this is recessed similar to the strip 17, Fig. 3 to receive the flanges $c$ and $d$ and flange portions 11 and 12 leaving an intermediate resilient body 24 within and between the flanges $c$ and $d$. In this construction, the coupling $e$ is in the form of a supply tube, or a channel tube, the side walls of which are forced inwardly under pressure to conform with and place the coupling strip 23 under sufficient pressure to securely and fixedly couple the members $a$ and $b$ together.

In Fig. 6 of the drawing, I have shown a coupling strip 25, somewhat similar to the strip 17 but which is preferably formed from a flat body as seen in Fig. 6ª of the drawing, which is bent or otherwise fashioned into U-shaped or channel formation to provide on the outer exposed side walls, projecting members 26, similar to the members 15 and 18 which engage the side walls of the coupling $e$. The strip 25, when folded, forms within the back and side walls, a dove-tailed recess 27 in which the flanges $c$ and $d$ are positioned. In this construction, said flanges are angularly disposed to each other instead of being parallel as in the other figures heretofore mentioned, so as to engage the angular walls 28 forming the dove-tailed recess 27.

In Fig. 7 of the drawing, the flanges $c$ and $d$ are arranged at a slight angle to each other, and a coupling strip 29 is arranged between the flanges $c$ and $d$ in the form of a spacing strip, the inner end 30 of said strip being enlarged to overlie the ends of the flanges $c$ and $d$. The outer end of the strip 29 is preferably beaded as seen at 31 and extended over the outer faces of the members $a$ and $b$ to form a bead-like joint between the adjacent walls of the members $a$ and $b$. This arrangement may also apply to the structure shown in Figs. 1, 3 and 5 if desired, depending entirely upon the requirements in the many uses of my invention. In securing the parts $a$ and $b$ together with the strip 29 therebetween, the pressure is applied to the side walls of the coupling $e$ to place the strip 29 under compression.

In Fig. 8 of the drawing, I have shown one method of coupling angularly disposed body members or walls 32 and 33 together. These walls may be in the form of metal, wood, glass, hard rubber, bakelite or similar panels. In this construction, I employ channel-shaped coupling bodies 34 and 35 having their channels arranged at right angles to each other to form a corner post body structure. The members 34 and 35 in the construction shown are secured together by inner and outer sheets 36 and 37, the inner sheet being folded around one side wall of each member 34—35 as seen at 36ª and 36ᵇ whereas the strip 37 is folded around the other side walls as seen at 37ᵃ and 37ᵇ, thus coupling said members together.

With this construction, I employ U-shaped coupling strips 38, both of which are of similar construction and are mounted within the channels of the members 34 and 35. The inner faces of the strips 38 are provided with longitudinally arranged and inwardly directed ribs or projections 39 adapted to engage opposite side walls of the channels 32 and 33, and which are flexed inwardly in the operation of inserting said panels in the channels of the strip 38, placing said strips under compression in this operation, to securely couple the panels to the couplings 34 and 35 and also to retain the strips 36 and 37 in place.

In Fig. 9 of the drawing, I have shown at 40 a corner post construction fashioned from a single sheet of material, and provided at the opposite sides of said sheet, channeled members 41 and 42, the channels of which are directed angularly to each other and at right angles in the construction shown. With this construction, two panel bodies 32ᵃ and 33ᵃ similar to the bodies 32 and 33 are coupled with the corner post 40 by mounting the same in U-shaped coupling strips 38ᵃ similar in all respects to the strips 38 shown in Fig. 8.

In Fig. 10 of the drawing, I have shown two body members 43 and 44 arranged angularly to each other and at right angles in the construction shown. The adjacent edges of said members to be coupled together are provided with inwardly directed flanges 45 and 46 respectively, similar in construction to the flanges c and d shown in Fig. 4 of the drawing.

In coupling the members 43 and 44 together, a U-shaped coupling strip 47 substantially similar to that shown in Fig. 4 is mounted upon the flanges 45 and 46 and is placed under compression in this operation by a U-shaped coupling body 48 substantially similar to the coupling e shown in Fig. 5.

It will be apparent that with my improved method of coupling two or more body members together, the desired attachment or coupling of the parts may be accomplished in a very quick and yet efficient manner, and the body members may be securely coupled together, and yet a slight yielding or cushioning action is provided in the mounting which will render the coupling of body portions less noiseless or susceptible to squeaking, especially when employed on vibratory body structures.

My improved construction will also enable each body member to withstand a certain amount of shock or strain, permitting the body members to yield relatively to each other to a slight extent under the resiliency of the coupling strips employed, without displacing the parts or causing serious damage thereto when subjected to slight jolts, jars or vibrations. It will also be apparent that neat and finished corners or intersections of body members will be provided with my improved construction, and where there are flush but invisible seams or joints, the portions provided intermediate the adjacent edges of the members may be fashioned to provide this result.

My invention may be used for many purposes such for example in coupling two sheet metal or other body members together in the construction of the bodies of motor vehicles, sheet metal door and door frame construction, cabinet and furniture structure, structural work of any kind or class, or where similar body members are coupled together, it being understood that any material may be employed in such members. While I have shown certain forms of coupling strips, and a few methods of arranging and mounting the same in coupling body members together, it will be understood that my invention is not necessarily limited to the specific structures herein shown and described, and various other changes therein and modifications thereof may be made within the scope of the appended claims, without departing from the spirit of my invention or sacrificing its advantages.

Having fully described my invention, what I claim as new and desire to secure by Letters Patent, is:

1. A coupling strip of the class described for use in coupling two body parts together comprising a body of yielding material engaging a portion of each of said parts, and a coupling member cooperating with said strip for placing the same under compression to secure said parts together, said strip including projecting members on one face thereof adapted to be flexed in coupling said parts together.

2. A coupling strip of the class described for use in coupling two body parts together comprising a body of yielding material engaging a portion of each of said parts, a coupling member cooperating with said strip for placing the same under compression to secure said parts together, said strip including projecting members on one face thereof adapted to be flexed in coupling said parts together, and a body interposed between the adjacent faces of said parts when coupled together to form a finished seam between said parts.

3. A coupling of the class described comprising a channel-shaped coupling member, and a coupling strip of yieldable material for securing two body parts together, said body parts having portions arranged within the channel of said member and said strip being interposed between said coupling member and said portions and being placed under compression in coupling said parts together, and said strip including projecting members adapted to be flexed in the operation of coupling said parts together.

4. A coupling of the class described comprising a channel-shaped coupling member, and a coupling strip of yieldable material for securing two body parts together, said body parts having portions arranged within the channel of said member and said strip being interposed between said coupling member and said portions and being placed under compression in coupling said parts together, said strip including projecting members adapted to be flexed in the operation of coupling said parts together, and a body interposed between the adjacent portions of said body parts.

5. A coupling of the class described comprising a channel-shaped coupling member, and a coupling strip of yieldable material for securing two body parts together, said body parts having portions arranged within the channel of said member and said strip being interposed between said coupling member and said portions and being placed under compression in coupling said parts together, said strip including projecting members adapted to be flexed in the operation of coupling said parts together, and a body interposed between the adjacent portions of said body parts and said body constituting part of said strip.

6. A coupling of the class described for use in coupling two body parts together comprising a strip of yielding material engaging a portion of each of said parts, a coupling member of rigid material cooperating with said strip to limit the expansion thereof, and said strip and coupling member slidably engaging said body parts in coupling the same together, placing said strip under compression in this operation to secure said parts together.

7. A coupling of the class described comprising a channel-shaped coupling member of rigid material and a coupling strip of yielding material for securing two body parts together, said body parts having portions arranged within the channel of said member and said strip being interposed between said coupling member and said portions and being placed under compression in passing said portions into said member to couple said body parts together.

8. A panel mounting of the class described comprising a channeled member, a recessed strip of rubber mounted in said channeled member, a portion of said panel being arranged in the recessed portion of said strip, said strip being under compression within said member to retain said panel against displacement, and opposite walls of said strip having projecting portions adapted to flex in securing the panel within and to said strip.

In testimony that I claim the foregoing as my invention I have signed my name this 3rd day of March, 1928.

HARRY E. SIPE.